Nov. 27, 1951 J. R. RICHARDS 2,576,641
LIDDER WITH OVERHEAD SIDE FLUSHERS
Filed Feb. 3, 1950 3 Sheets-Sheet 1

INVENTOR
JOHN R. RICHARDS
BY
ATTORNEY

Nov. 27, 1951 J. R. RICHARDS 2,576,641
LIDDER WITH OVERHEAD SIDE FLUSHERS
Filed Feb. 3, 1950 3 Sheets-Sheet 2

INVENTOR
JOHN R. RICHARDS
BY
ATTORNEY

Nov. 27, 1951 J. R. RICHARDS 2,576,641
LIDDER WITH OVERHEAD SIDE FLUSHERS
Filed Feb. 3, 1950 3 Sheets-Sheet 3

INVENTOR
JOHN R. RICHARDS
BY
ATTORNEY

Patented Nov. 27, 1951

2,576,641

UNITED STATES PATENT OFFICE 2,576,641

LIDDER WITH OVERHEAD SIDE FLUSHERS

John R. Richards, Riverside, Calif., assignor to Food Machinery and Chemical Corporation, San Jose, Calif., a corporation of Delaware Application February 3, 1950, Serial No. 142,327

3 Claims. (Cl. 1—10)

This invention relates to the lidding of boxes overfilled with fresh fruit or vegetables in which the overpack or produce extending above the upper edges of the box must be gathered inwardly from over said edges before the cover is pressed on the box in lidding the same.

The present invention is an improvement on the lidder with overpack gathering mechanism shown in U. S. Letters Patent No. 2,108,548, issued to Hale Paxton, February 15, 1938, on a Lidding Machine. In the Paxton machine the lidding is accomplished by lifting a platform carrying the box upwardly with reference to a nailing mechanism mounted thereabove. Gathering devices are pivotally supported on the nailing mechanism and swing inwardly as the box rises to gather the overpack inwardly from over the ends and sides of the box just prior to the pressing of the cover onto the box and the nailing of the ends of the cover to the ends of the box.

While the Paxton machine operated satisfactorily upon many commercial containers and products, the side flushers employed therein applied an increasing pressure inwardly on the lid, box, and product as the box continues to rise, following the gathering operation, in order to perform the lid pressing and nailing operations. This increase in pressure against the box sides and lid interferes with the proper lidding of light-weight boxes particularly where light-weight lids are used.

It is accordingly an object of the present invention to provide a lidder with overhead side flushers which will gather the overpack inward from over the box sides with an inward pressure which will remain constant throughout the lid pressing and lid nailing operations.

The manner of accomplishing the foregoing object, as well as further objects and advantages will be made manifest in the following description taken in connection with the accompanying drawings, in which.

Figure 1:
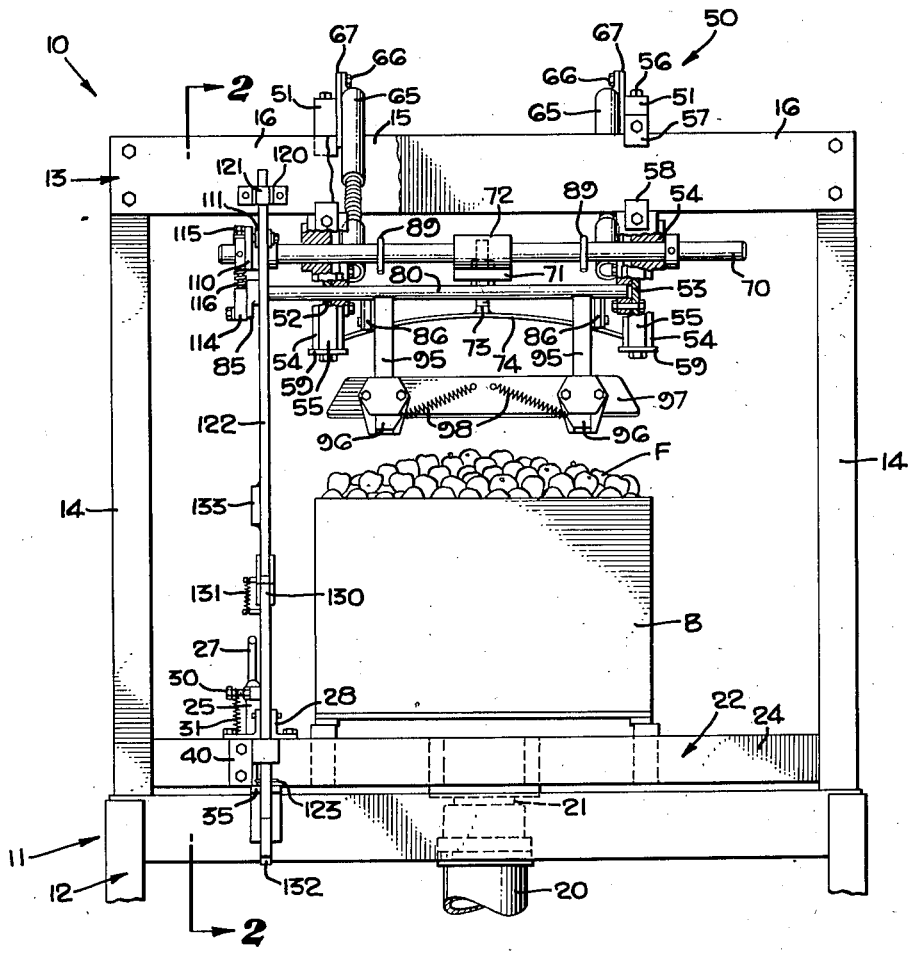
Fig. 1 is a diagrammatic fragmentary front elevational view of a lidding machine incorporating a preferred embodiment of the invention.

Referring specifically to the drawings, the lidding machine 10 diagrammatically shown therein is of the general type illustrated in the Paxton et al. Patent No. 2,084,048. It includes a frame 11 embracing a base structure 12 and a superstructure 13, the latter being supported on the base structure by four corner posts 14 and including longitudinal members 15 and 16 which connect the upper ends of posts 14.

The posts 14 are provided with holes 17 by which they are adjustably connected to the base structure 12 by bolts 18. Mounted on the base structure 12 is a hydraulic elevator 20 having a piston 21 on the upper end of which is mounted a box supporting platform 22, the latter having side bars 23 and 24.

Fixed on the bar 23 is a rod support 25 which is apertured at its upper end to slideably receive a rod 26 having a handle 27. Fixed on the upper edge of the bar 24 opposite the support 25 is a bearing 28 in which a lift dog 29 is pivotally mounted. The rod 26 extends horizontally through the machine and is pivotally connected to the dog 29 by a bolt 30. Attached by its opposite ends to said bolt and to the bearing 28 is an overthrow spring 31 for detaining the dog 29 in either of its operative and inoperative positions.

Provided on the base structure 12 is an angle rest 35. Secured on and extending rearwardly from the bar 24 is a bracket 40 which is slotted vertically to receive a block 41 having a serrated outer edge, which block divides the slot in which it is fixed into two vertical holes 43 and 44.

Carried on the superstructure 13 is a nailing unit or mechanism 50, this including two driver beams 51, opposite ends of which rest on members 15 and 16 and a pair of chuck beams 52 and 53, opposite ends of which have gibs 54 which slide vertically on gib bars 55 which are secured to the driver beams 51 by cap screws 56, said driver beams and gib bars being adjustably secured to members 15 and 16 by clamps 57 and 58.

Each gib bar 55 has a gib stop 59 secured on its lower end which limits the downward movement of gibs 54 on these bars. Each of the gibs 54 is pivotally connected to the lower end of one of four compression spring elements 65, the upper end of which is pivotally connected by a bolt 66 to one of two plates 67, each of which is pivotally connected by a bolt 68 to the adjacent driver beam 51. The chuck beams 52 and 53 carry nail chucks C from which nails are adapted to be driven by drivers D which are carried on the driver beams 51. The chuck beams 52 and 53 also support lid holders and end tuckers for tucking the overpack inwardly from over the ends of a box, but neither are these parts shown in the drawings as a full disclosure of these may be found in the above mentioned patents.

Gibs 54 are apertured to receive shafts 69 and 70, the first of which is fixed to the gibs receiving the same, and the second of which journals in the gibs supporting it. Supported on the shafts 69 and 70 is a cross-bar 71 having bearings 72 which receive the shafts 69 and 70. The shaft 69 is secured to the bearing 72 receiving it while the shaft 70 turns in the bearing 72 through which it passes. Disposed beneath the cross-bar 71 and supported thereon by threaded studs 73 is a curved lid shaping crown sheet 74.

Chuck beams 52 and 53 are also apertured to form bearings for a pair of flusher shafts 80 and 81, the first of these having dead end bearings at each end, but one end of the latter extends entirely through chuck beam 52 where said end carries an arm 85. Extending downwardly from the shaft 80 are short arms 86 which are connected to similar arms 87 extending upwardly from the shaft 81 by links 88. Connected to upper ends of arms 87 and to hooks 89 which extend around shaft 70, are coil springs 90.

Welded to the shafts 80 and 81 and extending downwardly and outwardly therefrom are flusher supporting arms 95 having stops 96 at their lower ends and slidably supporting flushers 97 which are yieldably held against the stops 96 by springs 98.

Figure 2:
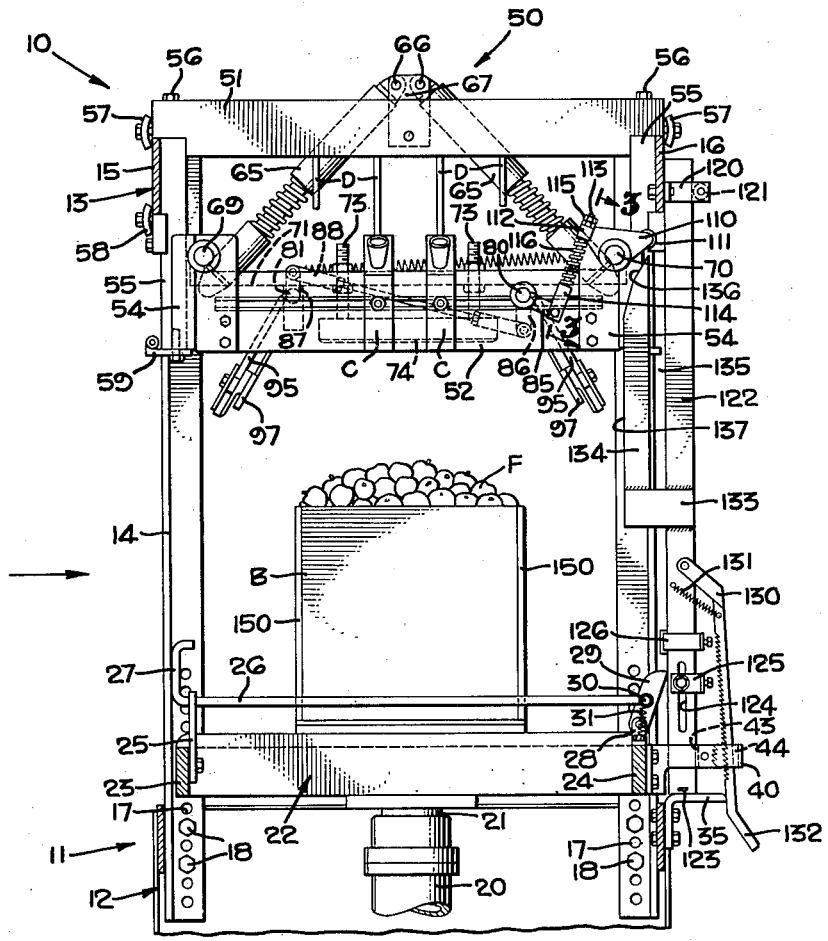
Fig. 2 is a fragmentary vertical sectional view taken on the line 2—2 of Fig. 1, Figs. 1 and 2 showing an over-filled box resting on the elevator platform of the machine in its lower position in readiness for starting a lidding operation.
Figure 4:
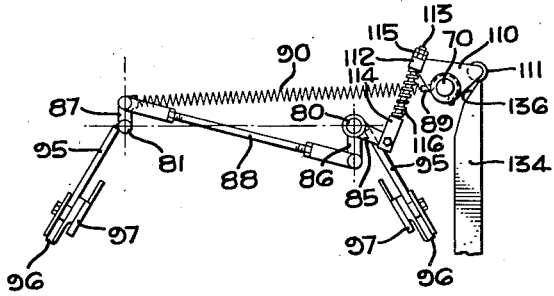
Fig. 4 is a diagrammatic view of said mechanism shown separately from its supporting structure.
Figure 3:
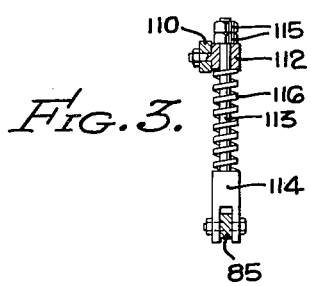
Fig. 3 is an enlarged detail sectional view taken on the line 3—3 in Fig. 2 and illustrating the structure of a resilient link of the tucker actuating mechanism.
Figure 6:
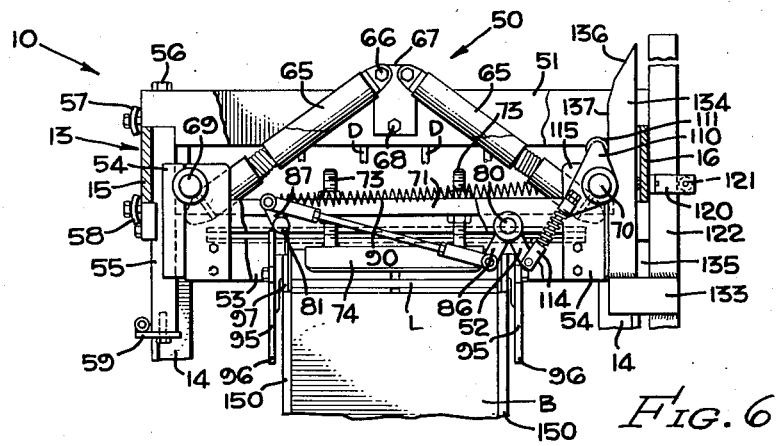
Fig. 6 is a fragmentary view similar to Fig. 3, and illustrating the box in its upwardmost position at the completion of the lid nailing operation.

Pivotally mounted on an extending end of shaft 70 is a rocker 110 carrying a cam follower roller 111 at one end thereof, and at the opposite end being pivotally connected to an apertured block 112 through which a threaded rod 113 extends, the opposite end of said rod terminating in a clevis 114 which is pivotally connected to arm 85 (Fig. 2). Nuts 115 hold the rod 113 in the block 112 and confine an expansion spring 116 which is coiled about the rod 113 between the block 112 and the clevis 114.

Secured to the member 15 and extending outwardly therefrom in the same plane as the rocker 110 is a slide yoke 120 between the forks of which a roller 121 is pivotally mounted. Vertically slidable within the yoke 120, is a cam supporting bar 122, the lower end of which extends through the hole 43 in the bracket 40, the withdrawal of said bar from the latter hole being prevented by a cotter pin 123 extending through a hole near the lower end thereof. Formed in the bar 122 is a vertical slot 124 through which a lug 125 is adjustably bolted to said bar. Another lug 126 is secured to said bar thereabove, and extends inwardly from said bar into the path of the dog 29 when the latter is in active position as shown in Fig. 2.

Pivoted on the bar 122 and extending downwardly therefrom through the hole 44 in the bracket 40 is a latch 130 which is urged inwardly by a contractile spring 131 attached at its opposite ends to said latch and said bar. The inner face of latch 130 is serrated and the lower end 132 of this latch is bent outward for a purpose to be made clear hereinafter.

Secured at its lower end to the vertical bar 122, by a plate 133 welded to both, is a flusher operating cam 134 which extends upwardly in inwardly spaced relation with the bar 122 so that a slot 135 is formed between said bar and said cam. The upper end of cam 134 has a short inwardly and downwardly sloping cam face 136 and, therebelow, a vertical cam face 137.

*Operation*

Figs. 1 and 2 illustrate the lidding machine 10 at the begining of a lidding operation with a box B, overfilled with fruit F such as tomatoes, pears, apples, or the like, inserted into the machine to rest upon the elevator table 22. The nailing mechanism 50 is, of course, equipped with a number of elements not shown in the accompanying drawings, but which are well-known parts of this type of lidding machine, such as end tuckers, and a lid holder. The latter comprises two devices supported on the chuck beams and into which a lid L is now inserted so that this will be supported above the box B.

The operator thereupon energizes the elevator 20 to raise the nailing table 22 and the box B resting thereon. As box B is of standard height, the dog 29 is left in its operative position as shown in Fig. 2 so that as the elevator table rises this dog engages the lug 126 and starts lifting the cam supporting bar and the cam 134 secured thereto. This brings the cam face 136 into engagement with the cam follower roller 111 so as to rotate said rocker, the motion of which is transmitted through the rod 113 and arm 85 to the flusher supporting shafts 80 and 81 thus swinging the flusher arms 95 and the flushers 97 inwardly.

Figure 5:
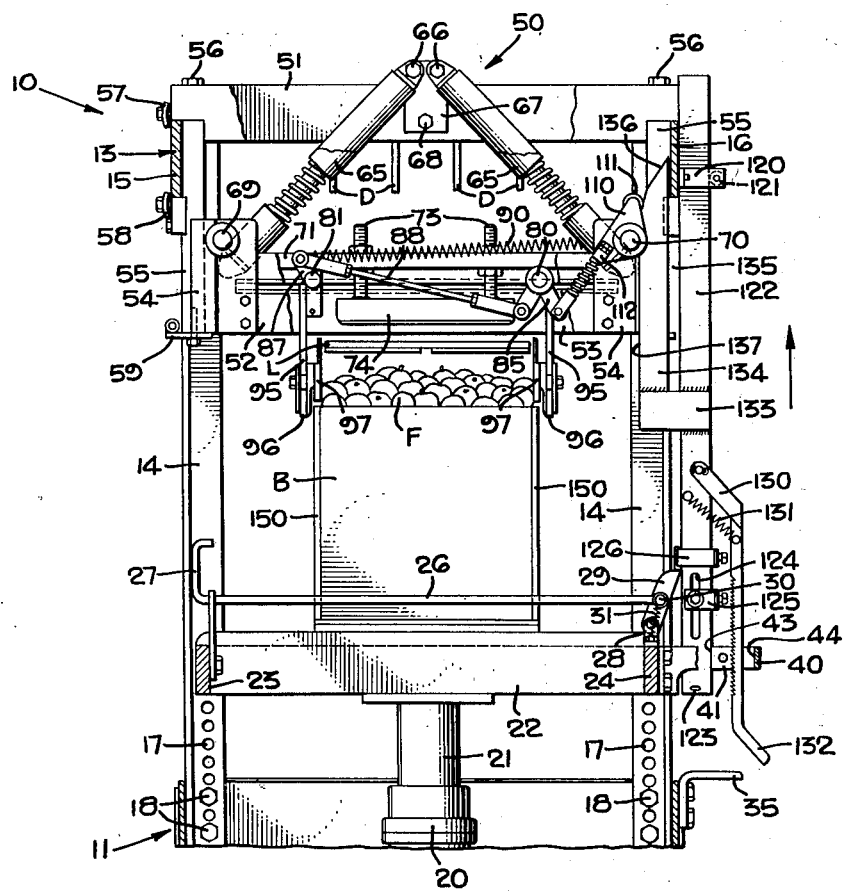
Fig. 5 is a view similar to Fig. 2 and illustrates an intermediate step in the lidding operation in which the box has been raised just to the point where the side flushers have been swung inwardly into gathering relation with the overpack.

This is timed with the rising of box B so that the flushers 97 just sweep inwardly over the upper edges of the sides 150 of the box B while disposed very close to these upper edges. This flushes the fruit F, which theretofor overlay the box sides 150, flush with the inner faces of these sides. Immediately following this flushing action, the sides 150 of the box engage the flushers 97 and slide these upwardly on the arms 95 (Fig. 5). During the remaining upward movement of the box B prior to the lid ends being compressed between the ends of the box B and the chuck beams 52 and 53 so as to press these lid ends onto said box ends and provide a solid connection between the elevator table 22 and said beams so that the latter are lifted, with still further upward movement of the elevator table 22, whereby the lid ends are nailed to the box ends.

It is to be noted that after the rocker 110 rides off of the bevelled face 136 of the cam 134 during the initial part of the upward movement of the elevator table 22 and which takes place at a point a slight distance above that shown in Fig. 5, the roller 111 rides onto the vertical inner face 137 of cam 134 so that through the balance of the upward movement of box B to accomplish the pressing the lid on the box and then the nailing of this to the box, no additional pressure is exerted by the rocker 110 tending to press the flushers 97 inwardly against the box sides 150, the fruit F or the lid L. It is clear from this that boxes with sides or lids made of light material and containing fruit F which is susceptible to damage by more than a very light pressure imposed thereon by the flushers, may be lidded in the lidding machine 10 without damage either to the container, the lid, or the fruit.

The lidding machine 10 is adapted for lidding half boxes which are approximately one-half the height of box B. When starting to lid a half box, and before energizing the elevator 20, the handle 27 is pulled forwardly, which is to say, towards the left in Fig. 2, so as to swing the dog 29 inwardly out of operative relation with the lug 126. The lifting of the bar 122 and cam 134 by the elevator table 22 will then be deferred until the bracket 40 engages the lug 125, which change in timing will be effective in delaying the inward swinging of the flushers 97 so that these will flush the fruit inwardly from over the sides of said half box in the same manner as takes place in the lidding of box B, and as hereinabove described.

The roller 121, engaging the outer edge of the bar 122, maintains the cam 134 in its true vertical position throughout the lidding operation in spite of the heavy pressure of the roller 111 against said cam, and the travel of said roller a substantial distance upwardly during the lid pressing and nailing operation on the opposite side of longitudinal member 16 from the roller 121.

As the elevator table 22 starts to rise, the latch 130 is withdrawn from contact with the angle rest 35 so that the spring 131 pushes this latch inwardly with its serrated inner face engaging the serrated face of the block 41 on the bracket 40. This latches the bar 122 to the nailing table 22 so that as the nailing table returns downwardly the bar 122 and cam 134 are connected to the table and descend with it, thus returning with the table to their original positions as shown in Fig. 2. During the final portion of the descent of table 22, the lower end 132 of the latch 130 engages the rest 35 so as to disengage this latch from engagement with the block 41 so that in the next operation of the machine the latch 130 will be re-engaged with this block when the rising table starts to lift the bar 122 which, as noted, may take place at different levels, depending on the position of the dog 29.

The claims are:

1. In a lid nailing machine, the combination of: a frame including a base structure and a superstructure; a nailing table mounted on said base structure for supporting an overfilled box to be lidded; a nailing unit mounted on said superstructure, said unit including a pair of chuck beams, each of which carries a bank of nail chucks, a pair of driver beams each of which carries a bank of drivers, the latter being slidable in said chucks, spring means for yieldably holding said chuck beams in downwardly spaced relation from said driver beams, and slide gib means guiding said chuck beams when the latter are shifted upwardly towards said driver beams by overcoming the resistance of said spring means; power means for causing relative vertical movement between said table and said nailing unit to apply said chuck beams to ends of a lid to press the latter onto the ends of said box, and then compress said spring means to drive nails through said lid ends and into said box ends; a pair of overpack flushers pivotally mounted on said chuck beams and slidable vertically relative thereto by engagement with upper edges of said box during the relative movement aforesaid; a cam rocker pivotally mounted on said chuck beams; means connecting said cam rocker to said gathering members; yieldable means for holding said gathering members in expanded relation; and a cam on said platform disposed to be brought into engagement with said cam rocker by said relative vertical movement to rock said rocker and swing said flushers inwardly over opposite upper edges of said box to gather overpacked product inwardly from over said edges, said cam presenting to said rocker following said actuation of said gathering members, a face which is parallel with the direction of said relative movement, whereby the position of said cam rocker remains substantially the same during the vertical sliding of said gathering members relative to said chuck beams and during the subsequent nail driving operation.

2. A combination as in claim 1 in which said superstructure includes corner posts and longitudinal members connecting said corner posts, and in which said driver beams are mounted on and connect said longitudinal members and in which said rocker is mounted on said chuck beams to travel upwardly with the latter just inside one of said longitudinal members; an elevator for elevating said platform to accomplish said relative vertical movement; a vertical bar mounted to be lifted by said platform during said relative vertical movement, said bar lying outside of and having a sliding relation with the longitudinal member adjacent said rocker; and means for mounting said cam on said vertical bar at its lower end with said cam disposed vertically and spaced inwardly from said bar so that in its upward travel said cam passes inside of said longitudinal member and the latter is received in the space between said cam and said bar.

3. A combination as in claim 2 in which a roller is provided on said longitudinal member adjacent said rocker and engaging the outermost edge of said bar to absorb pressure therefrom which is transmitted to said bar by said cam engaging said rocker.

JOHN R. RICHARDS.

REFERENCES CITED

The following references are of record in the file of this patent:

UNITED STATES PATENTS

| Number | Name | Date |
| --- | --- | --- |
| 2,100,282 | Keech | Nov. 23, 1937 |